United States Patent
Iijima

(10) Patent No.: US 8,931,352 B2
(45) Date of Patent: Jan. 13, 2015

(54) CLEANING QUALITY CONTROL SYSTEM USING ELECTROMAGNETIC FLOW METER, AND CLEANING QUALITY CONTROL METHOD

(71) Applicant: Kabushiki Kaisha Toshiba, Minato-ku, Tokyo (JP)

(72) Inventor: Takuya Iijima, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 55 days.

(21) Appl. No.: 13/902,229

(22) Filed: May 24, 2013

(65) Prior Publication Data

US 2014/0174196 A1 Jun. 26, 2014

(30) Foreign Application Priority Data

Dec. 25, 2012 (JP) ................................. 2012-281714

(51) Int. Cl.
*G01F 1/56* (2006.01)
*G01F 1/64* (2006.01)

(52) U.S. Cl.
CPC ........................................ *G01F 1/64* (2013.01)
USPC ..................................................... 73/861.08

(58) Field of Classification Search
None
See application file for complete search history.

(56) References Cited

FOREIGN PATENT DOCUMENTS

| JP | 5-144787 A | 6/1993 |
|----|------------|--------|
| JP | 6-194337 A | 7/1994 |
| JP | 2000-202765 A | 7/2000 |
| JP | 2011-041482 A | 3/2011 |
| KR | 10-2011-0081269 A | 7/2011 |

OTHER PUBLICATIONS

Korean Office Action dated Jun. 17, 2014 in counterpart Korean Application No. 10-2013-0009076.

*Primary Examiner* — Harshad R Patel
(74) *Attorney, Agent, or Firm* — Holtz, Holtz, Goodman & Chick PC

(57) ABSTRACT

A cleaning quality control device to automatically determine cleaning quality as to whether or not cleaning has been completed from a detection signal of the electromagnetic flow meter,
the cleaning quality control device includes, an S/N ratio measuring unit to measure an S/N ratio of the detection signal, and a cleaning completion determining unit which is provided with an S/N ratio•electric conductivity determining table in which outputs of the S/N ratio measuring unit and respective electric conductivities of detergent drains are previously made correspondent using the detergent drains with predetermined electric conductivities, and which outputs cleaning completion when an obtained electric conductivity thereof becomes not more than a predetermined electric conductivity, and
obtains the electric conductivity of the detergent drain from a value of the S/N ratio of the electromagnetic flow meter, and thereby automatically determines the cleaning quality as to whether or not cleaning has been completed.

3 Claims, 3 Drawing Sheets

CLEANING QUALITY CONTROL SYSTEM USING ELECTROMAGNETIC FLOW METER, AND CLEANING QUALITY CONTROL METHOD

CROSS-REFERENCE TO RELATED APPLICATION

This application is based upon and claims the benefit of priority from the prior Japanese Patent Application No. 2012-281714, filed on Dec. 25, 2012, the entire contents of which are incorporated herein by reference.

FIELD

Embodiments of the present invention relate to a cleaning quality control system using an electromagnetic flow meter, and a cleaning quality control method.

BACKGROUND

An electromagnetic flow meter is a device to measure a flow rate of fluid having electric conductivity. Electromagnetic flow meters include, a general type in which an electrode to detect a speed of flow is provided at an inner wall portion of a measurement pipe to flow fluid therein, and which is used for the measurement of liquid with an electric conductivity of not less than 3 μS/cm, in the state in which the electrode is in contact with the fluid, and a type called a capacitive type with a high input impedance in which an electrode is provided outside a wall between measurement pipes, and which can measure even an electric conductivity of pure water with an electric conductivity of not less than 0.01 μS/cm, in the state in which the electrode is not in contact with the fluid.

In such an electromagnetic flow meter, since there is not any operating portion at an inner wall of a measurement pipe to flow fluid therein, factors to raise the electric conductivity (to increase impurity content) are small, and since there is not any operating component, an electromagnetic flow meter is used for the flow rate measurement at the time of various cleanings, such as in cleaning devices in respective treatment processes in a semiconductor manufacturing process, and an adjusting device of chemicals concentration.

In a semiconductor wafer manufacturing process, for example, a pure water supplying device of an overflow system is used, and wafers are cleaned with pure water using a plurality of cleaning tanks. An electromagnetic flow meter is used for controlling a quantity of the pure water supplied to this cleaning tank (refer to Patent Document 1, for example).

In addition, in a residual chlorine measuring device to measure residual chlorine or residual concentration of other chemicals, concentration preparation with pure water is performed, and a flow meter is used for the flow rate control of the pure water (refer to Patent Document 2, for example).

In addition, also in a polishing device of a surface of a semiconductor wafer, a flow meter is used for controlling the pure water which is supplied for supplying abrading agent and for cleaning (refer to Patent Document 3, for example).

(Since the comparison with the following technical documents is indispensable, for setting problems so as to make clear the patentability of the present invention, the description of the contents and problematic points thereof will be described.)

PRIOR ART DOCUMENT

Patent Document

[Patent Document 1] Japanese Patent Application Publication No. Hei 5-144787

[Patent Document 2] Japanese Patent Application Publication No. Hei 6-194337

[Patent Document 3] Japanese Patent Application Publication No. 2000-202765

SUMMARY

Problems to be Solved by the Invention

In the cleaning in a semiconductor wafer manufacturing process, to control the cleaning quality of a semiconductor, and to reduce a quantity of pure water used for cleaning to minimum are important, for reducing a pure water manufacturing cost and shortening a semiconductor manufacturing time.

However, in a method to clean wafers with pure water using a plurality of cleaning tanks of an overflow system as shown in Patent Document 1, since the number of wafers to be treated, and the degree of cleaning quality in the treatment are different in condition for each treatment process, it has been difficult to automatically judge quality of the cleaning quality.

For the reason, with respect to the quality in a cleaning process, a method of using a large amount of pure water of not less than a definite amount, or a control method in which, each time after cleaning the electric conductivity of the drain is measured, and the cleaning is continued till the drain becomes pure water, has been employed, but there were a problem to consume a large amount of pure water, and a problem that great care is required for quality determination of the cleaning quality.

In addition, in the case of the residual concentration control as shown in Patent Document 2, since a dilution treatment is continued while pure water is supplied, till the chemicals concentrations of the blended product and the drain after cleaning become not more than a definite value, there was likewise a problem to desire for the automatic determination of the qualities of the blended solution and the detergent drain with a high degree of accuracy.

In addition, in the cleaning in the polishing process of wafers disclosed in Patent Document 3, since each time after cleaning the electric conductivity of the drain is measured, and the cleaning is continued till the electric conductivity becomes a value not more than a control reference, there was a problem that great care is required.

The present invention is made to solve the above-described problems, and makes it an object to provide a cleaning quality control system using an electromagnetic flow meter and a cleaning quality control method, in which the characteristics of an electromagnetic flow meter which can measure even fluid with a low electric conductivity is utilized, and detection signals of the electromagnetic flow meter and respective electric conductivities of detergent drains are previously made correspondent, and which without measuring the electric conductivities of the detergent drains in various types of cleaning processes at each time, can continuously obtain the electric conductivity of the detergent drain, and can automatically determine the quality of the cleaning quality as to whether or not the cleaning has been completed.

Means for Solving the Problem

In order to achieve the above-described object, a cleaning quality control system using an electromagnetic flow meter of the present embodiment includes an electromagnetic flow meter to flow detergent drain of not less than a definite amount whose flow rate is measurable and to measure the flow rate of the detergent drain, and a cleaning quality control device to automatically determine cleaning quality as to whether or not cleaning has been completed from a detection signal of the electromagnetic flow meter, and the cleaning quality control device includes an S/N ratio measuring unit to measure an S/N ratio of the detection signal of the electromagnetic flow meter, and a cleaning completion determining unit which is provided with an S/N ratio•electric conductivity determining table in which outputs of the S/N ratio measuring unit and respective electric conductivities of detergent drains are previously made correspondent using the detergent drains with predetermined electric conductivities, and which outputs cleaning completion when an obtained electric conductivity thereof becomes not more than a predetermined electric conductivity, and obtains the electric conductivity of the detergent drain from a value of the S/N ratio of the electromagnetic flow meter, and thereby automatically determines the cleaning quality as to whether or not cleaning has been completed.

In order to achieve the above-described object, a cleaning quality control system using an electromagnetic flow meter of the present embodiment includes a first electromagnetic flow meter and a second electromagnetic flow meter each to flow detergent drain of not less than a definite amount whose flow rate is measurable and to measure the flow rate of the detergent drain, a cleaning quality control device to automatically determine cleaning quality as to whether or not cleaning has been completed from each of detection signals of the first and the second electromagnetic flow meters, and a detergent drain switching portion to switch so as to make the detergent drain flow to the first electromagnetic flow meter or the second electromagnetic flow meter by a drain system switching signal which is supplied from a cleaning device provided outside the cleaning quality control device, the electromagnetic flow meter is composed of the first electromagnetic flow meter of a wetted type which is provided with an electrode to contact the detergent drain, and the second electromagnetic flow meter of a capacitive type which is provided with an electrode of a non-wetted type, the cleaning quality control device includes an S/N ratio measuring unit to measure each of S/N ratios of the detection signals of the first and the second electromagnetic flow meters, and a cleaning completion determining unit which is provided with S/N ratio•electric conductivity determining tables corresponding to the first and the second electromagnetic flow meters in each of which output values of the S/N ratio measuring unit and respective electric conductivities of the detergent drains are made correspondent using the detergent drains of predetermined electric conductivities, and which outputs cleaning completion when an obtained electric conductivity thereof becomes not more than a predetermined electric conductivity, the detergent drain switching portion switches a supply system of the detergent drain to the first electromagnetic flow meter or the second electromagnetic flow meter, when the drain system switching signal is present, and the cleaning quality determining unit automatically determines the cleaning quality of the detergent drain of the system corresponding to the drain system switching signal.

In order to achieve the above-described object, a cleaning quality control system using an electromagnetic flow meter of the present embodiment is a cleaning quality control method using an electromagnetic flow meter for a cleaning quality control system which is provided with an electromagnetic flow meter to flow detergent drain of a definite amount whose flow rate is measurable and to measure the flow rate of the detergent drain, and a cleaning quality control device to automatically determine cleaning quality as to whether or not cleaning has been completed from a detection signal of the electromagnetic flow meter, and includes a step to prepare an S/N ratio•electric conductivity determining table in which S/N ratios of the detection signals of the electromagnetic flow meter and respective electric conductivities of detergent drains are previously made correspondent using the detergent drains of predetermined cleaning qualities, a step to measure the S/N ratio of the detection signal of the electromagnetic flow meter, and a step to output cleaning completion when an electric conductivity obtained with reference to the measured S/N ratio and the S/N ratio•electric conductivity determining table which is previously made correspondent becomes not more than a predetermined electric conductivity, and obtains the electric conductivity of the detergent drain from a value of the S/N ratio of the electromagnetic flow meter, and thereby automatically determines the cleaning quality as to whether or not cleaning has been completed.

DETAILED DESCRIPTION

Hereinafter, embodiments of the present invention will be described with reference to the drawings.

(First Embodiment)

Figure 1:
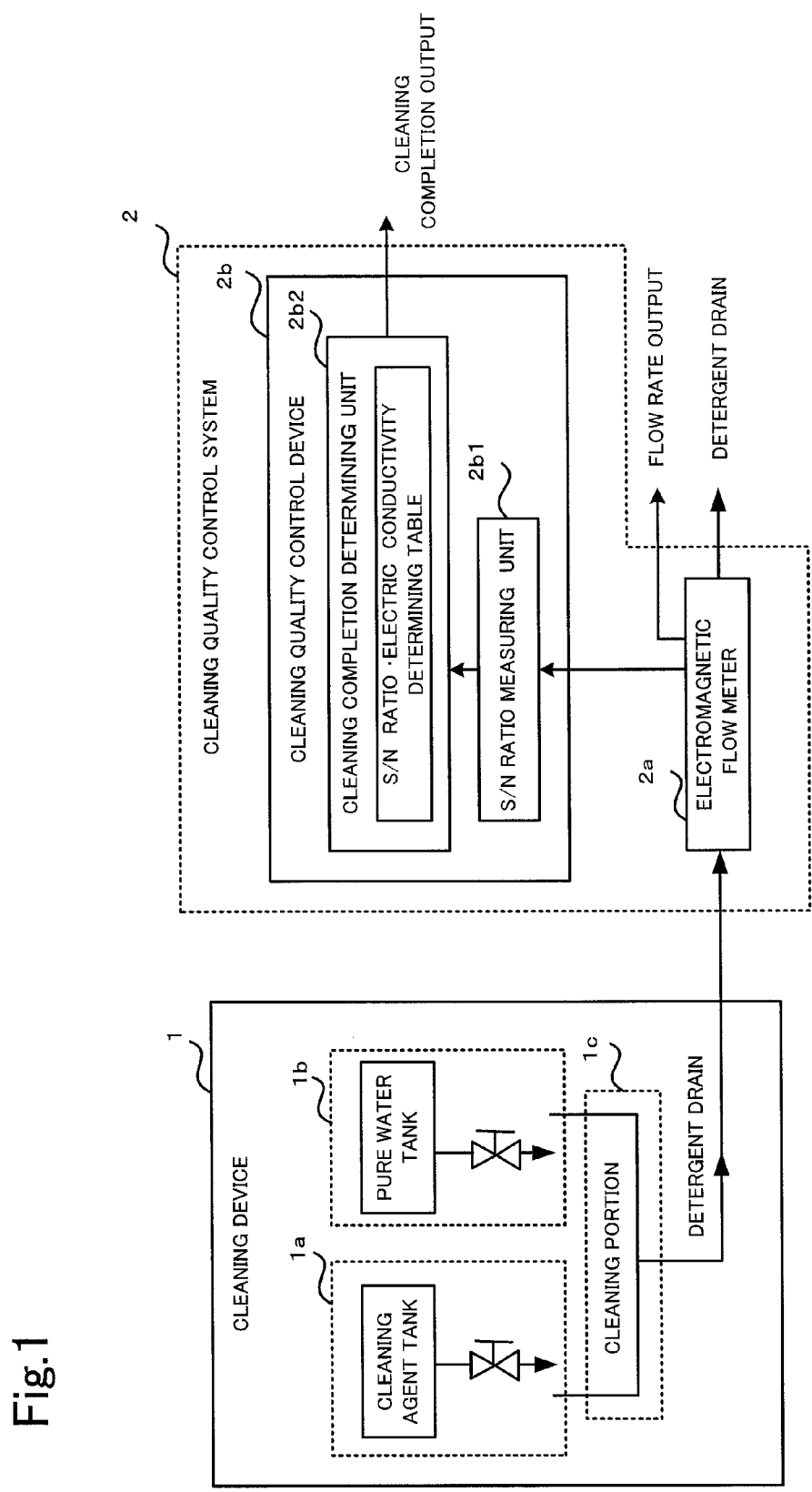
[FIG. 1] A configuration diagram of a cleaning quality control system of a first embodiment.

A cleaning quality control system using an electromagnetic flow meter of a first embodiment will be described with reference to FIG. 1 and FIG. 2.

To begin with, the measurement principle of the present invention will be described. Generally, with respect to cleaning quantity, the electric conductivity thereof changes by an amount of impurities contained in detergent drain. That is, the smaller the impurities are, the lower the electric conductivity becomes, and if the detergent drain approaches to ideal pure water, the electric conductivity thereof approaches to 0.05 µS/cm.

Accordingly, even in the case of an electromagnetic flow meter with a high input impedance, in the measurement of a flow rate in the region close to pure water, a detection signal drops, and thereby an S/N ratio required for the measurement will not be obtained.

Here, the measurement principle of a cleaning quality control system using an electromagnetic flow meter of the present embodiment is that using detergent drains of predetermined electric conductivities, an S/N ratio•electric conductivity determining table in which S/N ratios and the respective electric conductivities of the detergent drains are made correspondent is previously prepared, and in the state in which detergent drain of not less than a definite amount whose flow rate is measurable flows, an S/N ratio of a detection signal of the electromagnetic flow meter to measure a flow rate of the detergent drain is measured.

And, in the region close to pure water, with reference to the S/N ratio•electric conductivity determining table, it is determined that the measured S/N ratio becomes not more than a predetermined electric conductivity to assume that the cleaning has been completed, and thereby the cleaning completion is outputted.

Next, a configuration of a cleaning quality control system using an electromagnetic flow meter of a first embodiment will be described with reference to FIG. 1.

A cleaning quality control system 2 using an electromagnetic flow meter of the first embodiment is provided with, an electromagnetic flow meter 2a to measure a flow rate of detergent drain from a cleaning device 1 to flow the detergent drain of not less than a definite amount whose flow rate is measurable, and a cleaning quality control device 2b to determine quality of the cleaning quality from a detection signal of the electromagnetic flow meter 2a.

The cleaning quality control device 2b is provided with an S/N ratio measuring unit 2b1 to measure an S/N ratio of the detection signal of the electromagnetic flow meter 2a, and a cleaning completion determining unit 2b2 which is provided with an S/N ratio•electric conductivity determining table in which output values of the S/N ratio measuring unit 2b1 and the respective electric conductivities of the detergent drains are made correspondent using detergent drains with predetermined electric conductivities, and outputs cleaning completion when an obtained electric conductivity thereof becomes not more than a predetermined electric conductivity.

The cleaning device 1 to discharge the detergent drain to be measured is generally provided with a cleaning agent supplying portion 1a with a cleaning agent tank and so on to supply cleaning agent for an object to be cleaned as disclosed in Patent Documents 1-3, a pure water supplying portion 1b provided with a pure water tank and so on used during cleaning, and a cleaning portion 1c to clean the object to be cleaned using also the pure water supplied from the pure water supplying portion 1b, and discharges the detergent drain outside the device.

In the cleaning by the cleaning device 1, it is assumed that, for each cleaning process of the object to be cleaned, the supply quantities of the cleaning agent and pure water to be used are previously set, and with respect to the flow rate of the detergent drain, a flow rate thereof with not less than a predetermined definite amount flows at the time of determination of the cleaning quality. In addition, it is assumed that the reference quality of the detergent drain as to whether or not the cleaning has been completed is previously determined.

Next, an operation of the cleaning quality control system 2 based on the measurement principle like this will be described. To begin with, a method of preparing the S/N ratio•electric conductivity determining table will be described with reference to FIG. 2.

Figure 2:
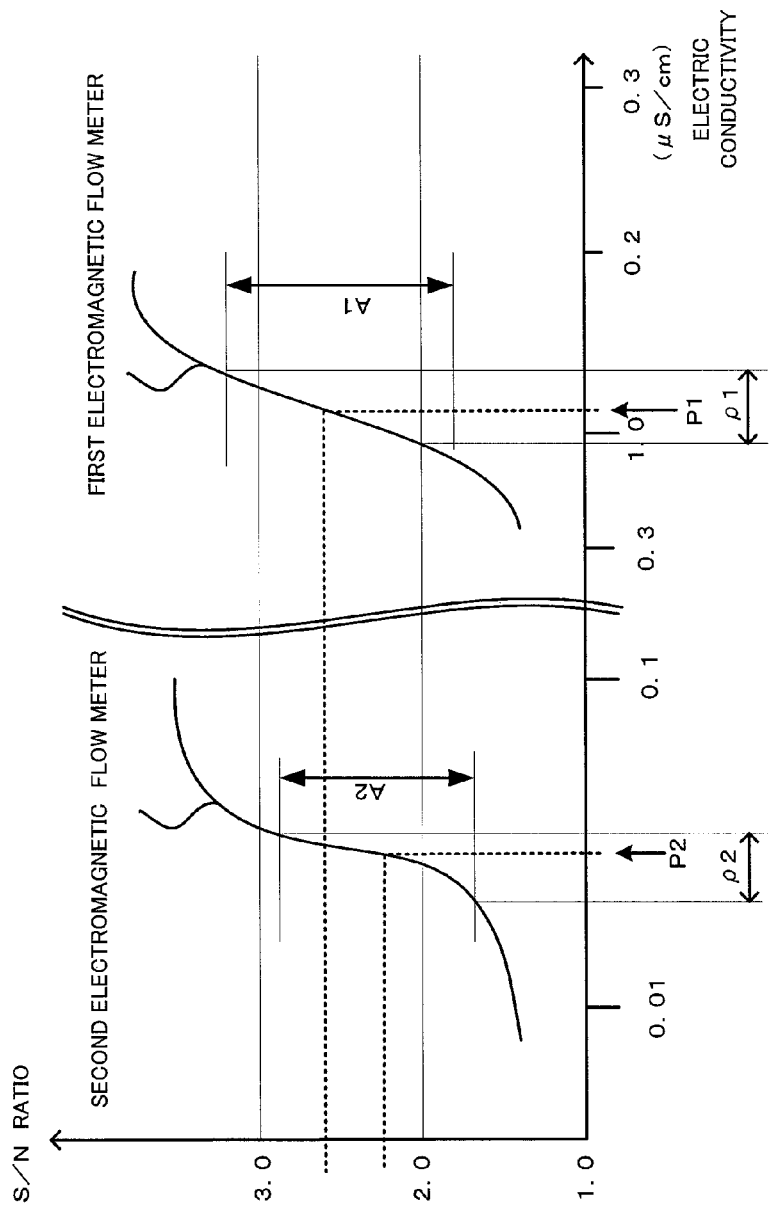
[FIG. 2] A characteristic diagram showing the correspondence of an electric conductivity and an S/N ratio.

FIG. 2 shows characteristics of an electric conductivity and a detection signal of an electromagnetic flow meter in a simulated manner in order to prepare an S/N ratio•electric conductivity determining table. In FIG. 2, the horizontal axis indicates an electric conductivity (μS/cm) of detergent drain, and the vertical axis indicates an S/N ratio obtained from the detection signal of the electromagnetic flow meter.

A first electromagnetic flow meter exhibits the characteristics of a type of a wetted type which is provided with an electrode to contact detergent drain, for example, and a second electromagnetic flow meter exhibits the characteristics of a high input impedance type called a capacitive type which is provided with an electrode of a non-wetted type.

As shown in FIG. 2, a range of an S/N ratio in which a detection signal of the first electromagnetic flow meter and an electric conductivity can be made correspondent is an arrow A1, and a range of the corresponding electric conductivity at this time is ρ1. In addition, a range of an S/N ratio in which a detection signal of the second electromagnetic flow meter and an electric conductivity can be made correspondent is an arrow A2, and a range of the corresponding electric conductivity at this time is ρ2.

For the quality determination of the detergent drain, in the respective ranges of ρ1 and ρ2, one point P1 in ρ1 and one point P2 in ρ2 are set, or a plurality of points not shown are set.

Because a range of the electric conductivity in this quality determination differs depending on the characteristics of an electromagnetic flow meter, using detergent drains of predetermined electric conductivities in order to control the cleaning quality, output values of the S/N ratio measuring unit 2b1 and the respective electric conductivities of the detergent drains are made correspondent to thereby obtain as an S/N ratio•electric conductivity determination table.

In addition, the correspondence relation between an S/N ratio and an electric conductivity may be not linear, but it is only necessary that the required cleaning control quality (precision) is reproducible with respect to the determination point of cleaning completion In addition, with respect to the measurement of an S/N ratio, in order that, as the cause of the drop of the S/N ratio, the case in which the flow rate of the detergent drain drops or the detergent drain does not flow can be discriminated from the case in which the electric conductivity drops, it is necessary to previously assure a flow rate in which the stable flow rate measurement is enabled at the cleaning device 1 side.

For example, in FIG. 2, since the ranges A1, A2 of the S/N ratio which can be made correspondent to the electric conductivity are 1<S/N ratio which can be made correspondent<3, in the detergent drain whose electric conductivity has not dropped, the flow rate in which the S/N ratio is not less than 3 is previously obtained, and at the time of electric conductivity measurement, the measurement is performed while the detergent drain of not less than this flow rate is flowed.

Next, an operation of the cleaning quality control system 2 will be described. The detergent drain from the cleaning device 1 is supplied to the electromagnetic flow meter 2a through the piping, and is discharged.

And, when the cleaning is started, the electromagnetic flow meter 1 measures the flow rate, and sends its detection signal to the S/N ratio measuring unit 2b1.

The measuring system of the S/N ratio measuring unit 2b1 may be a pulse height analysis pulse count system which performs pulse height analysis of the detection signal, and counts the number of pulses at a predetermined peak value within a predetermined definite measuring time. A method of obtaining this S/N ratio may be defined according to a processing system of a measurement signal in each electromagnetic flow meter, and therefore this measuring system is not limited.

And, an output of an S/N ratio of the measuring unit 2b1 is sent to the cleaning completion determining unit 2b2, and an electric conductivity obtained with reference to the S/N ratio•electric conductivity determining table is compared with the electric conductivity that becomes a predetermined determination reference for the cleaning completion, to thereby determine whether or not the cleaning has been completed.

In addition, when the cleaning completion reference for the cleaning quality is set to a low electric conductivity close to ideal pure water, an electromagnetic flow meter of a capacitive type is used, and thereby the measurable range can be selected.

(Second Embodiment)

Figure 3:
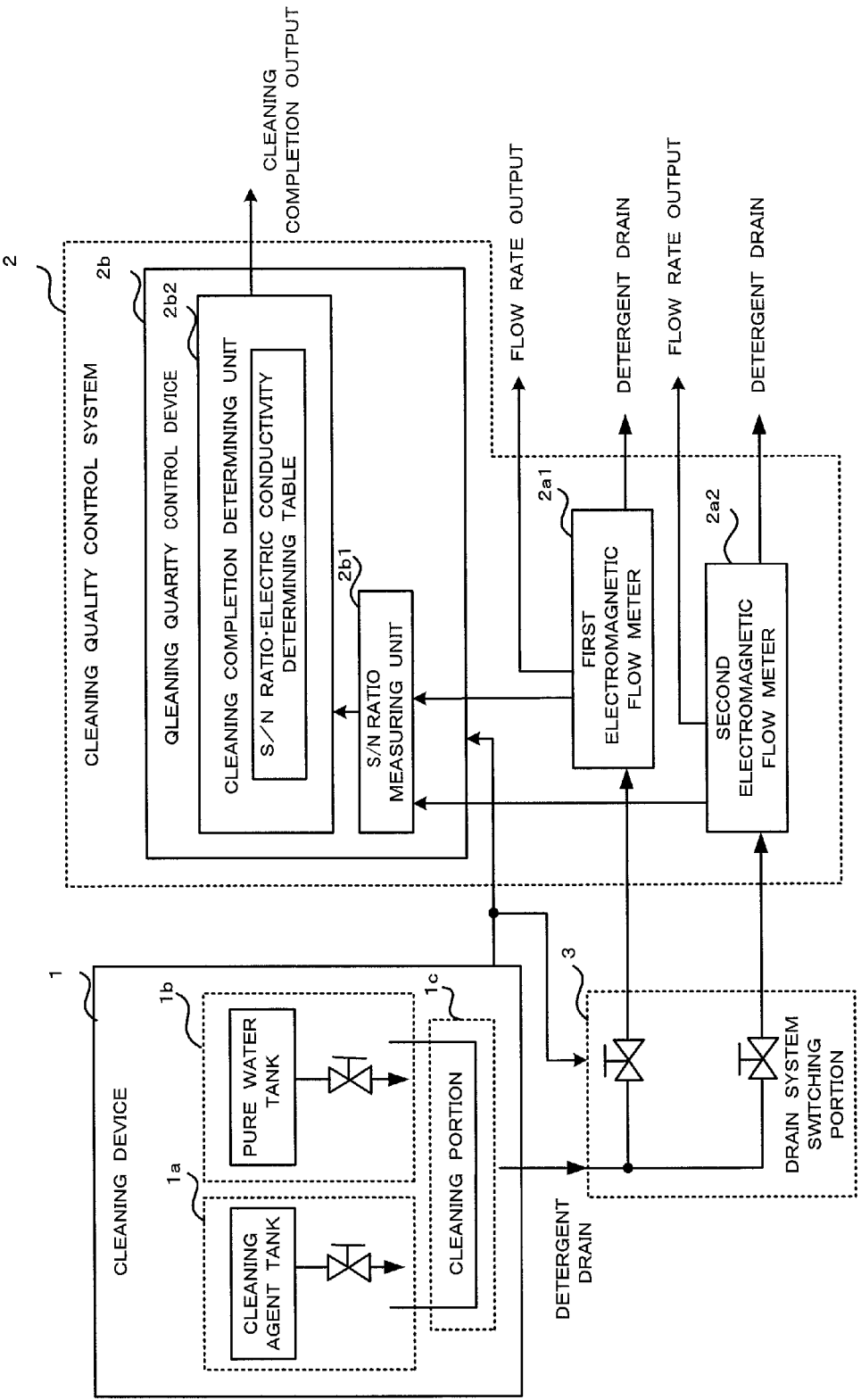
[FIG. 3] A configuration diagram of a cleaning quality control system of a second embodiment.

Next, a configuration of a cleaning quality control system using an electromagnetic flow meter of a second embodiment will be described with reference to FIG. 3.

The same symbols are given to the same portions of the second embodiment as in the first embodiment, and the description thereof will be omitted. The point in which the second embodiment is different from the first embodiment lies in the fact that the first embodiment determines the cleaning completion of the detergent drain with an electromagnetic flow meter, but the cleaning quality control system of the second embodiment is provided with a switching portion 3 of a drain system, supplies the detergent drain to any of a first electromagnetic flow meter 2a1 and a second electromagnetic flow meter 2a2 based on a switching signal of the detergent drain system from the cleaning device 1, and thereby automatically determines the cleaning quality of the detergent drain over a wide range.

According to the cleaning quality control system using an electromagnetic flow meter of the second embodiment, the system of the detergent drain is automatically switched, and thereby the quality of the detergent drain can be determined in a short time.

As described above, according to the embodiments, it is possible to provide a cleaning quality control system using an electromagnetic flow meter and a cleaning quality control method, in which the characteristics of an electromagnetic flow meter which can measure even fluid with a low electric conductivity is utilized, and detection signals of the electromagnetic flow meter and electric conductivities of detergent drains are previously made correspondent, and which without measuring the electric conductivities of the detergent drains in various types of cleaning processes at each time, can continuously obtain the electric conductivity of the detergent drain, and can automatically determine the quality of the cleaning quality as to whether or not the cleaning has been completed.

While certain embodiments of the present invention have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A cleaning quality control system using an electromagnetic flow meter, comprising:
   an electromagnetic flow meter to flow detergent drain of not less than a definite amount whose flow rate is measurable and to measure the flow rate of the detergent drain; and
   a cleaning quality control device to automatically determine cleaning quality as to whether or not cleaning has been completed from a detection signal of the electromagnetic flow meter;
   the cleaning quality control device including, an S/N ratio measuring unit to measure an S/N ratio of the detection signal of the electromagnetic flow meter, and a cleaning completion determining unit which is provided with an S/N ratio•electric conductivity determining table in which outputs of the S/N ratio measuring unit and respective electric conductivities of detergent drains are previously made correspondent using the detergent drains with predetermined electric conductivities, and which outputs cleaning completion when an obtained electric conductivity thereof becomes not more than a predetermined electric conductivity; and
   obtains the electric conductivity of the detergent drain from a value of the S/N ratio of the electromagnetic flow meter, and thereby automatically determines the cleaning quality as to whether or not cleaning has been completed.

2. A cleaning quality control system using an electromagnetic flow meter, comprising:
   a first electromagnetic flow meter and a second electromagnetic flow meter each to flow detergent drain of not less than a definite amount whose flow rate is measurable and to measure the flow rate of the detergent drain;
   a cleaning quality control device to automatically determine cleaning quality as to whether or not cleaning has been completed from each of detection signals of the first and the second electromagnetic flow meters; and
   a detergent drain switching portion to switch so as to make the detergent drain flow to the first electromagnetic flow meter or the second electromagnetic flow meter by a drain system switching signal which is supplied from a cleaning device provided outside the cleaning quality control device;
   the electromagnetic flow meter being the first electromagnetic flow meter of a wetted type which is provided with an electrode to contact the detergent drain, and the second electromagnetic flow meter of a capacitive type which is provided with an electrode of a non-wetted type;
   the cleaning quality control device including, an S/N ratio measuring unit to measure each of S/N ratios of the detection signals of the first and the second electromagnetic flow meters, and a cleaning completion determining unit which is provided with S/N ratio•electric conductivity determining tables corresponding to the first and the second electromagnetic flow meters in each of which output values of the S/N ratio measuring unit and respective electric conductivities of the detergent drains are made correspondent using the detergent drains of predetermined electric conductivities, and which outputs cleaning completion when an obtained electric conductivity thereof becomes not more than a predetermined electric conductivity;
   the detergent drain switching portion switching a supply system of the detergent drain to the first electromagnetic flow meter or the second electromagnetic flow meter, when the drain system switching signal is present; and
   the cleaning quality determining unit automatically determining the cleaning quality of the detergent drain of the system corresponding to the drain system switching signal.

3. In a cleaning quality control method using an electromagnetic flow meter for a cleaning quality control system which is provided with an electromagnetic flow meter to flow detergent drain of a definite amount whose flow rate is measurable and to measure the flow rate of the detergent drain, and a cleaning quality control device to automatically determine cleaning quality as to whether or not cleaning has been completed from a detection signal of the electromagnetic flow meter;
   the cleaning quality control method using an electromagnetic flow meter comprising:
   a step to prepare an S/N ratio•electric conductivity determining table in which S/N ratios of the detection signals of the electromagnetic flow meter and respective electric conductivities of detergent drains are previously made correspondent using the detergent drains of predetermined cleaning qualities;

a step to measure the S/N ratio of the detection signal of the electromagnetic flow meter; and a step to output cleaning completion when an electric conductivity obtained with reference to the measured S/N ratio and the S/N ratio•electric conductivity determining table which is previously made correspondent becomes not more than a predetermined electric conductivity; and obtains the electric conductivity of the detergent drain from a value of the S/N ratio of the electromagnetic flow meter, and thereby automatically determines the cleaning quality as to whether or not cleaning has been completed.

* * * * *